United States Patent Office 3,012,017
Patented Dec. 5, 1961

3,012,017
FOAM CONTROL IN MONOVINYLIDENE AROMATIC COMPOUND-ACRYLATE SYSTEMS
Mary D. Lindstrom, Springfield, Mass., assignor to Monsanto Chemical Company, St. Louis, Mo., a corporation of Delaware
No Drawing. Filed Dec. 30, 1957, Ser. No. 705,767
3 Claims. (Cl. 260—80.5)

The present invention is directed to controlling foam production in polymer systems and more particularly to attaining foam control in monovinylidene aromatic compound-acrylate emulsion systems.

Excessive foaming in styrene-acrylate copolymer systems is frequently experienced. This is particularly true in systems in which the copolymers are contained in fine particle size. In addition to taking place during the actual polymerization or reaction, excessive foaming also occurs in after treatment as during stripping, the latter generally carried out to remove unreacted monomer from the interpolymer. This problem has been resolved in the past by addition of antifoaming materials generally taking the form of long-chain monohydric alcohols such as lauryl and octyl alcohols. These expedients have not, however, contributed a satisfactory solution to the problem with respect to the polymer systems here involved.

Accordingly, it is a primary object of the present invention to provide a process by which to control foam production in monovinylidene aromatic compound-acrylate emulsion reaction mixtures.

Another object is to provide such control during reactions or polymerizations directed to the production of styrene-acrylate interpolymers.

Another object is to provide foam control in after treatments following emulsion polymerizations of that type.

Other objects will in part be obvious and will in part appear hereinafter.

These and other objects are attained by contacting a styrene-acrylate emulsion reaction mixture with a polyhydric alcohol selected from the class consisting of diols and triols.

The following examples are given in illustration and are not intended as limitations on the scope of this invention. Where parts are mentioned, they are parts by weight.

Example I

The following charges are premixed for use in this reaction.

Kettle charge:                                    Amounts (grams)
    Aralkyl polyether alcohol _____ 9.96
    Tetrasodiumpyrophosphate _____ .1414
    Sodium salt of aralkyl polyether sulfate ____ 2.35
    Water _____ 4.02
Catalyst premix:
    $K_2S_2O_8$ (potassium persulfate) _____ 1.32
    $K_2SO_4$ (potassium sulfate) _____ 1.32
    Aralkyl polyether alcohol _____ .50
    Sodium salt of aralkyl polyether sulfate ____ 10.16
    Water _____ 132.00
Monomer I premix, Styrene _____ 100
Monomer II premix:
    Styrene _____ 144
    2-ethylhexyl acrylate _____ 144
    Methacrylic acid _____ 12

The kettle charge is added to a glass-lined reaction vessel, then heated to reflux temperature under agitation, after which the catalyst premix is slowly and continuously added over an 80-minute period. During the first 30 minutes, monomer I premix is slowly added together with the first 30% of the catalyst premix. During the last 50 minutes, monomer II premix is added together with the remainder of the catalyst premix. The resultant reaction mixture is maintained at reflux temperature until a temperature peak occurs, at which time the polymerization reaction is substantially complete. The resulting reaction mixture is subjected to stripping. In general, this can be accomplished by distillation of the water and unreacted monomer. Here, the distillation is carried out at a constant temperature of 100° C. until the percent solids reach 47± 1 percent. A stripping time of 75 minutes is found to be required, the result of excessive foaming.

Example II

The procedure and amounts set forth in Example I are utilized with the exception that the kettle charge contains 0.5 grams of ethylene glycol. The stripping, carried out under similar distillation conditions requires 53 minutes. The amount of foaming experienced during stripping is observed to be considerably less than that which occurs in the preceding example.

In order to further exemplify the advantages obtained through exercise of the present invention, the following experiments are performed:

Example III

Materials in the amounts and sequence listed are progressively charged into separate 100 cc. graduates, identified as A, the control graduate, and B, the comparative graduate. Comparative graduate B initially contains 10 drops of ethylene glycol thus distinguishing from control A. After the initial charge and each addition the graduates are shaken 10 times and the total level representing the material plus foam head is observed.

| Material | A<br>Total Level in ccs. (Without Glycol) | B<br>Total Level in ccs. (With 10 drops ethylene glycol) |
|---|---|---|
| (a) 40 cc. sodium salt of aralkyl polyether sulfate (10% in water), and 10 cc. aralkyl polyether alcohol (10% in water) _____ | 76 | 65 |
| (b) 2 drops styrene _____ | 79 | 67 |
| (c) 2 drops 2-ethylhexyl acrylate _____ | 89 | 66 |

Example IV

The same procedure as that of Example III is carried out. The control graduate is denominated C. The comparative graduate D initially contains glycerine instead of ethylene glycol.

| Material | C<br>Total Level in ccs. (Without Glycerine) | D<br>Total Level in ccs. (With 10 drops of Glycerine) |
|---|---|---|
| (a) 40 cc. sodium salt of aralkyl polyether sulfate (10% in water), and 10 cc. aralkyl polyether alcohol (10% in water) _____ | 70 | 58 |
| (b) 2 drops styrene _____ | 110 | 88 |
| (c) 2 drops ethylhexyl acrylate _____ | 98 | 76 |

The present invention is directed to controlling foam production in monovinylidene aromatic compound-acrylate type emulsions and prescribes contacting mixtures thereof with a polyhydric alcohol selected from the class consisting of diols and triols having up to and including 8 carbon atoms. The polyhydric alcohols which may be utilized include diols such as: 1,3-butane diol, 1,5-pentane diol, 1,6-hexane diol, 1,8-octane diol, 2,2-dimethyl-1,3-propane diol; triols such as: trimethylol propane and 1,2,6-hexane triol; polyhydric alcohols exhibiting unsaturation such as: 1,4-butene diol, 1,4-butyne diol, 2,5-dimethyl-2,5- dihydroxy-3-hexyne are intended; as well as polyhydric alcohols having ether linkages or sulfur linkages: diethylene glycol, triethylene glycol, tetraethylene glycol, thiodiglycol, etc., and mixtures thereof. Preference is directed to ethylene glycol and glycerine. The intended systems are those in which the polymerization is of the emulsion type and may include in addition to acrylates and styrenes, other monomers which are compatible therewith. To state it another way the systems must be binary systems, at least containing the acrylate and styrene components, but can include other monomers in addition to those two to form higher numbered systems, ternary, etc. Contact between the polyhydric alcohol, presently intended for use as a foam control agent, and the mixture can be carried out in any convenient method as by dissolving or suspending the polyhydric alcohol in the system prior to, during, or after polymerization, the latter intended to facilitate after treatment such as stripping and the like. Preferably, the amount of polyhydric alcohol employed ranges between 0.2–1.0% by weight of the polymer mixture.

The acrylates intended are esters of acrylic acid with an alcohol. The alcohol moiety of the ester can contain up to and including 20 carbon atoms and higher. The acids used can be acrylic, methacrylic and mixtures thereof. Suitable monovinylidene aromatic compounds in addition to styrene which satisfy the requirement include alpha-methyl styrene, alpha-methyl-p-methyl styrene, p-methyl styrene, m-ethyl styrene, p-isopropyl styrene, p-chloro styrene, 2,4-dichlorostyrene, 2,5-dichloro styrene, p-bromo styrene, vinyl naphthalene, etc., and mixtures thereof.

The desired end products which the present invention facilitates production of, are latices prepared by aqueous emulsion interpolymerization of the monomers in the presence of a polymerization catalyst and an emulsifier. The amount of water used varies with the solids content desired for the final latex. Preferably, about 100–250 parts of water are used per 100 parts of monomer mixture to form latices having solids contents of about 50–30%. However, the amount of water may be increased or decreased to form latices having lower or higher solids contents.

Suitable polymerization catalysts or initiators include conventional free radical-generating initiators such as potassium persulfate, benzoyl peroxide, lauroyl peroxide, di-tertiary-butyl peroxide, cumene hydroperoxide, azobis-isobutyronitrile, etc. Two or more such initiators may be used if desired. When the polymerization is conducted at temperatures below reflux, initiators of the redox type may be used, e.g., potassium persulfate with sodium bisulfite, hydrogen peroxide with ferrous sulfate, hydrogen peroxide with ferric sulfate and sodium pyrophosphate, etc. Usually, about 0.01–1 part of initiator is used per 100 parts of monomer mixture.

The emulsifier may be one or more of a variety of anionic and nonionic emulsifiers such as salts of high molecular weight fatty acids, amine soaps, alkali metal salts of rosin acids, alkali metal salts of long-chain alkyl sulfonates and sulfates, ethylene oxide condensates of long-chain fatty acids, alcohols or mercaptans, sodium salts of sulfonated hydrocarbons, sodium salts of aralkyl sulfonates, etc. Usually about 0.1–5 parts of emulsifier are used per 100 parts of monomer mixture.

In the polymerization process disclosed in illustration of this invention, the ingredients of the polymerization formulation are pre-mixed to form four charges: a kettle charge, catalyst charge, monomer I charge and monomer II charge. The kettle charge comprises a major portion of the water requirement and, optionally, a minor amount of the polymerization initiator and/or the emulsifier. The catalyst charge comprises a minor amount of the water requirement, all or a major portion of the polymerization catalyst, and all or a major portion of the emulsifier. Conventional polymerization aids such as buffers, particle size regulators, activators, etc., may be present in the reaction vessel charge and/or the catalyst charge.

The foam production control agent, diol or triol is conveniently included in the pre-mixed kettle charge, this charge being the first to be added to the reaction vessel. This procedure serves to control foam production throughout the entire process. As previously stated, it is possible and may be desirable under certain conditions to include the agent in one of the other charges or to add it independently at some convenient time during polymerization, or again afterwards to independently facilitate after treatment, such as stripping. The foam production control agent, polyhydric alcohol or mixtures thereof, can also be added in increments throughout the process as by including a fraction thereof in each of the pre-mix charges. The occasion for its use will ultimately dictate its particular utilization.

In the illustrative process the kettle vessel charge is added to a suitable reaction vessel and heated to polymerization temperature with agitation. The polymerization may be conducted at temperatures of about 30°–150° C. and under atmospheric or super-atmospheric pressure or under vacuum, but the preferred conditions are reflux temperature and atmospheric pressure. The reaction vessel is preferably purged of oxygen by conventional methods, e.g., by flushing with nitrogen, bringing the reaction vessel charge to reflux temperature, etc. The indicated latices at this stage have an acid pH and, although they may be used per se, they are preferably adjusted to a pH of about 8–10 with a basic material such as ammonia or an alkali metal or ammonium salt of a water-soluble organic acid. It is then preferable to enhance the stability of the latices by the addition of further amounts of a nonionic or anionic emulsifier of the types mentioned above.

The products attained in the illustrative process of this invention are interpolymer latices which can be dried to form continuous films which are non-tacky at room temperature. Variations in the monomer proportions and further variations in the weight ratio of monomer I charge to monomer II charge yield latices having different properties, e.g., varying film fusion temperatures. Although the latices which fuse at higher temperatures find application in various fields, e.g., in textile finishing, those of particular interest are the latices which fuse at relatively low temperature, i.e., at about room temperature.

Applications for the latices include use in mineral coating compositions for paper, textile finishing compositions, various surface coating compositions, etc. They may be compounded with suitable pigments, resinous materials, fillers, thickening agents, stabilizing agents, etc., for use in these applications.

It will thus be seen that the objects set forth above, among those made apparent from the preceding description are efficiently attained and, since certain changes may be made in carrying out the above process without departing from the scope of the invention, it is intended that all matter contained in the above description shall be interpreted as illustrative and not in a limiting sense.

What is claimed is:

1. A process for preparing a latex of an interpolymer of a monovinylidene aromatic compound and an acrylate ester while simultaneously suppressing the production of foam usually associated therewith, which process consists essentially of (1) emulsifying 100 parts of a monovinylidene aromatic compound-acrylate ester monomer mixture in water containing an emulsifier, a free radical generating polymerization initiator and 0.2–1.0 part of a 2–8 carbon atom aliphatic polyhydric alcohol containing 2–3 hydroxyl groups, and (2) agitating said emulsion while heating said emulsion to a temperature of about 30–150° C. to polymerize the monomers; said acrylate ester containing an acid moiety selected from the group consisting of acrylic acid and methacrylic acid and an alcohol moiety which contains 1–20 carbon atoms.

2. A process for preparing a latex of a terpolymer of styrene, 2-ethylhexyl acrylate and methacrylic acid while simultaneously suppressing the production of foam usually associated therewith, which process consists essentially of (1) emulsifying 100 parts of a styrene, 2-ethylhexyl acrylate, methacrylic acid monomer mixture in water containing an emulsifying agent which consists of a binary mixture of an aralkyl polyether alcohol and a sodium salt of an aralkyl polyether sulfate, a free radical generating polymerization initiator, and 0.2–1.0 part of ethylene glycol, and (2) agitating said emulsion while heating the emulsion to a temperature of about 30–150° C. to polymerize the monomers.

3. A process for preparing a latex of a terpolymer of styrene, 2-ethylhexyl acrylate and methacrylic acid while simultaneously suppressing the production of foam usually associated therewith, which process consists essentially of (1) emulsifying 100 parts of a monomer mixture consisting of 61% styrene, 36% 2-ethylhexyl acrylate and 3% methacrylic acid in water containing an emulsifying agent which consists of a binary mixture of an aralkyl polyether alcohol and a sodium salt of an aralkyl polyether sulfate, a free radical generating polymerization initiator, and 0.2–1.0 part of ethylene glycol, and (2) agitating said emulsion while heating the emulsion to a temperature of about 30–150° C. to polymerize the monomers.

References Cited in the file of this patent
UNITED STATES PATENTS

| | | |
|---|---|---|
| 2,137,393 | Dorough | Nov. 22, 1938 |
| 2,337,681 | Pollack | Dec. 28, 1943 |
| 2,767,153 | Sutton | Oct. 16, 1956 |